US011426989B2

(12) United States Patent
Logunov et al.

(10) Patent No.: US 11,426,989 B2
(45) Date of Patent: Aug. 30, 2022

(54) LASER BONDED TRANSPARENT GLASS-BASED ARTICLES AND METHODS OF MAKING THE SAME

(71) Applicant: CORNING OPTICAL COMMUNICATIONS LLC, Hickory, NC (US)

(72) Inventors: Stephan Lvovich Logunov, Corning, NY (US); Alexander Mikhailovich Streltsov, Corning, NY (US)

(73) Assignee: Corning Optical Communications LLC, Charlotte, NC (US)

(*) Notice: Subject to any disclaimer, the term of this patent is extended or adjusted under 35 U.S.C. 154(b) by 43 days.

(21) Appl. No.: 16/391,719

(22) Filed: Apr. 23, 2019

(65) Prior Publication Data

US 2019/0248123 A1    Aug. 15, 2019

Related U.S. Application Data

(63) Continuation of application No. PCT/US2017/061751, filed on Nov. 15, 2017.
(Continued)

(51) Int. Cl.
  *B32B 37/06* (2006.01)
  *B32B 37/04* (2006.01)
  (Continued)

(52) U.S. Cl.
  CPC ............ *B32B 37/06* (2013.01); *B23K 26/21* (2015.10); *B23K 26/244* (2015.10); *B23K 26/324* (2013.01); *B32B 7/04* (2013.01); *B32B 37/14* (2013.01); *C03B 23/20* (2013.01); *C03B 23/203* (2013.01); *C03B 23/207* (2013.01); *C03B 23/22* (2013.01); *C03C 23/0025* (2013.01);
  (Continued)

(58) Field of Classification Search
  None
  See application file for complete search history.

(56) References Cited

U.S. PATENT DOCUMENTS 5,489,321 A * 2/1996 Tracy ................. C03C 27/06
                                                       156/99
6,548,176 B1   4/2003 Gwo
(Continued)

FOREIGN PATENT DOCUMENTS

CN    1871182 A    11/2006
EP    0233146 A1    8/1987
(Continued)

OTHER PUBLICATIONS

International Search Report and Written Opinion of the International Searching Authority; PCT/2017/061751 dated Mar. 13, 2018; 12 Pages; European Patent Office.
(Continued)

*Primary Examiner* — Linda L Gray
(74) *Attorney, Agent, or Firm* — Grant A. Gildehaus

(57) ABSTRACT

Methods of making a transparent glass-based article including at least two transparent glass-based substrates and a laser-induced bond therebetween. Methods include arranging the two transparent glass-based substrates relative to each other to form a contact area. Methods also include providing a laser beam contiguous the contact area to bond the two transparent glass-based substrates.

24 Claims, 5 Drawing Sheets

Related U.S. Application Data

(60) Provisional application No. 62/424,194, filed on Nov. 18, 2016.

(51) Int. Cl.

| | | |
|---|---|---|
| *B32B 37/14* | (2006.01) | |
| *B23K 26/21* | (2014.01) | |
| *B23K 26/244* | (2014.01) | |
| *B23K 26/324* | (2014.01) | |
| *C03B 23/20* | (2006.01) | |
| *C03B 23/203* | (2006.01) | |
| *C03B 23/22* | (2006.01) | |
| *C03B 23/207* | (2006.01) | |
| *C03C 27/06* | (2006.01) | |
| *C03C 23/00* | (2006.01) | |
| *B32B 7/04* | (2019.01) | |
| *B23K 103/00* | (2006.01) | |

(52) U.S. Cl.
CPC .......... *C03C 27/06* (2013.01); *B23K 2103/54* (2018.08); *B32B 2310/0843* (2013.01); *B32B 2315/08* (2013.01)

(56) References Cited

U.S. PATENT DOCUMENTS

| | | |
|---|---|---|
| 6,576,863 B1 | 6/2003 | Piltch et al. |
| 8,148,179 B2 | 4/2012 | Aitken et al. |
| 8,397,537 B2 | 3/2013 | Grzybowski et al. |
| 8,616,023 B2 | 12/2013 | Grzybowski et al. |
| 9,515,286 B2 | 12/2016 | Dabich, II et al. |
| 10,297,787 B2 | 5/2019 | Dejneka et al. |
| 2004/0206953 A1 | 10/2004 | Morena et al. |
| 2005/0029240 A1 | 2/2005 | Dugan et al. |
| 2012/0100318 A1 | 4/2012 | Danzl et al. |
| 2012/0247063 A1 | 10/2012 | Grzybowski et al. |
| 2013/0068384 A1* | 3/2013 | Liu .............. B23K 26/064 219/121.61 |
| 2016/0268541 A1 | 9/2016 | Dabich, II et al. |
| 2016/0280594 A1 | 9/2016 | Muehlke et al. |
| 2017/0219826 A1 | 8/2017 | Haseltine et al. |
| 2017/0327419 A1 | 11/2017 | Boek et al. |

FOREIGN PATENT DOCUMENTS

| | | |
|---|---|---|
| WO | 2015/164241 A1 | 10/2015 |
| WO | 2016/069822 A1 | 5/2016 |

OTHER PUBLICATIONS

Plotnichenko et al; "Hydroxyl Groups in High-Purity Silica Glass"; Journal of Non-Crystalline Solids, 261 (2000) pp. 186-194.

Veiko et al; "Laser Fabrication of MOC Based on Soft Laser Heating of Glass and Glass-Like Materialss"; Proceedings of SPIE; pp. 159-167; 1993.

\* cited by examiner

LASER BONDED TRANSPARENT GLASS-BASED ARTICLES AND METHODS OF MAKING THE SAME

PRIORITY APPLICATIONS

This application is a continuation of International Application No. PCT/US17/61751, filed on Nov. 15, 2017, which claims the benefit of priority to U.S. Application No. 62/424,194, filed on Nov. 18, 2016, both applications being incorporated herein by reference.

BACKGROUND

The present disclosure relates to laser-bonded transparent articles and methods of making the same.

Laser-induced bonding of transparent glass-based substrates has been the subject of considerable research in recent years because of the potential for forming transparent glass-based packages and/or transparent glass-based objects or stacks. Conventional methods have included depositing non-transparent dopants and/or layers between the glass-based substrates before laser-induced bonding. These conventional methods have produced opaque areas between bonded glass-based substrates which has restricted application of said methods and articles formed therefrom.

Accordingly, a need exists for a method of laser-induced bonding of transparent glass-based substrates to from transparent glass-based articles.

SUMMARY

According to one embodiment of the present disclosure, an article is disclosed including a first substrate, a second substrate, and a laser-induced bond that joins the first substrate and the second substrate. In embodiments, the first or second substrate absorbs at a wavelength from about 2500 nm to about 3000 nm.

According to an embodiment of the present disclosure, an article is disclosed including a first substrate, a second substrate, and a laser-induced bond that joins the first substrate and the second substrate. In embodiments, the first and/or the second substrate includes a hydroxyl concentration greater than about 100 ppm.

According to an embodiment of the present disclosure, a method for forming a glass-based stack is disclosed. In embodiments, the method includes arranging a first substrate relative to a second substrate to form a contact area. In embodiments, the method includes directing a laser beam comprising a wavelength from about 2500 nm to about 3000 nm contiguous the contact area. In embodiments, the first and/or second substrate absorbs light from the laser beam in an amount sufficient to heat and bond the first substrate and second substrate contiguous the contact area.

Before turning to the following Detailed Description and Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

BRIEF DESCRIPTION OF THE FIGURES

The disclosure will be better understood, and features, aspects and advantages other than those set forth above will become apparent when consideration is given to the following detailed description thereof. Such detailed description makes reference to the following drawings, wherein.

DETAILED DESCRIPTION

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the exemplary methods and materials are described below.

Figure 1A:
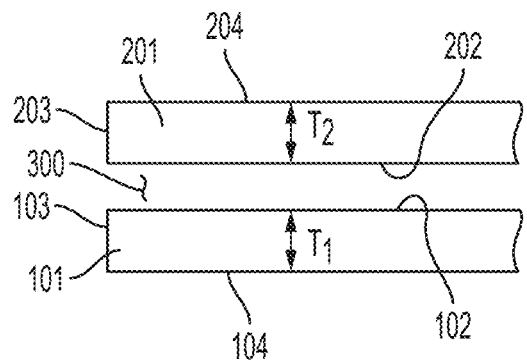
FIGS. 1A-D is a method of laser-induced bonding of substrates according to an embodiment of the present disclosure.
Figure 1B:
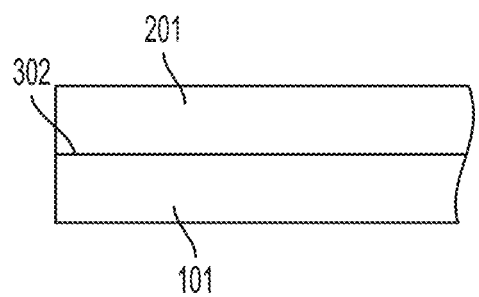
Figure 1C:
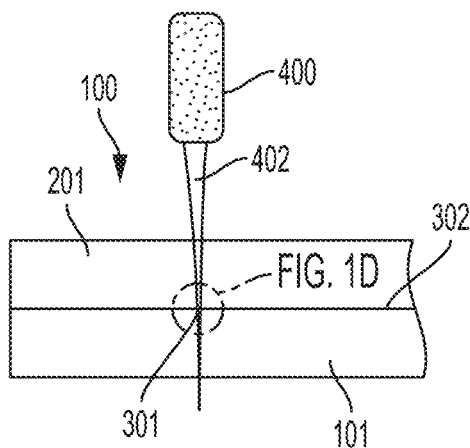

The present disclosure provides methods of laser bonding at least two transparent substrates together to form a transparent glass-based article 100. FIGS. 1A-1D illustrate an example method of forming article 100. As shown in FIG. 1A, methods of the present disclosure include arranging a first substrate 101 relative to a second substrate 201. First and second glass-based substrates 101, 201 may be a glass, a ceramic, and/or a glass-ceramic. Substrate 101 shown in FIGS. 1A-C includes a thickness T1 between opposite major surfaces 102, 104, and at least one edge 103. Substrate 201 shown in FIGS. 1A-C includes thickness T2 between opposite major surfaces 202, 204, and at least one edge 203. Substrates 101, 201 may have a thickness from about 0.1 mm to about 10 mm or more. Substrates 101, 201 may have any shape such as that of a pane, an optical fiber, a rod, a tube, a lens, a mirror, an ingot, a shield, or a filter. The shape of substrate 101 may be the same or different as substrate 201. Substrates 101, 201 in FIGS. 1A-C are shown as substantially flat for illustration purposes only. Of course, substrates 101, 201 can be flat, curved, rounded, circular, cylindrical, or other shapes typical of substrates. Of course, transparent glass-based article 100 may include any number of substrates greater than 1, such as 2, 3, 5, 10, 15, 20, 25, 50, 75, 100 or more substrates.

Glass-based substrates of the present disclosure transmit at least a portion of visible wavelengths from one major surface to the other. In embodiments, glass-based substrates of the present disclosure transmit at least a portion of wavelengths from about 400 nm to about 750 nm. In embodiments, glass-based substrates of the present disclosure transmit about 40% or more of wavelengths from about 400 nm to about 750 nm, or about 60% or more, or about 80% or more, such as 40%, 50%, 60%, 70%, 80%, 90% or more, including all ranges and subranges therebetween, of wavelengths from about 400 nm to about 750 nm. Visible light transmission (Tvis) at each wavelength from about 400 nm to about 750 nm may not be the same. In embodiments, glass-based substrates of the present disclosure are non-crystalline, inorganic amorphous solids. In embodiments, glass-based substrates of the present disclosure are transparent. In embodiments, glass-based substrates of the present disclosure are colorless.

Referring back to FIG. 1A, methods of the present disclosure include arranging glass-based substrate 101 relative to glass-based substrate 201 to eliminate or close a space 300 therebetween. In embodiments, glass-based substrate 101 is arranged relative to glass-based substrate 201 to form a contact area therebetween. Conventional methods of arranging glass-based substrates have typically included depositing dopants and/or layers between the glass-based substrates before laser-induced bonding. That is, glass-based surfaces arranged for laser bonding by conventional methods are typically either opaque, include a composition different than substrates 101, 201, or have a layer between their surfaces. Methods of the present disclosure include arranging glass-based substrates 101, 201 such that the surfaces thereof are in direct contact.

Either of opposite major surfaces 102, 104 or edge 103 of glass-based substrate 101 may form the contact area with either of opposite major surfaces 202, 204 or edge 203 of glass-based substrate 201. That is, one of edge 103, surface 102, or surface 104 of glass-based substrate 101 may form the contact area with one of edge 203, surfaces 202, or surface 204 of glass-based substrate 201. In embodiments, the contact area between glass-based substrate 101 and glass-based substrate 201 is configured to include a bonding area between glass-based substrates 101, 201. In embodiments, such as shown in FIG. 1B, the contact area is an overlap area 302 between glass-based substrates 101, 201. One or both of glass-based substrates 101, 201 may have a coefficient of thermal expansion (CTE) from about $0.1 \times 10^{-6}$ °C.$^{-1}$ to about $10 \times 10^{-6}$ °C.$^{-1}$ (at about 25° C.). Glass-based substrate 101 may have a CTE within 50% of a CTE of glass-based substrate 201. That is, glass-based substrates 101, 201 may have a CTE±50% of each other. This CTE matching of glass-based substrates 101, 201 may ensure the substrates and/or laser-induced bond does not break due stresses created therebetween during laser irradiation heating.

Referring to FIG. 1C, methods of the present disclosure may include providing or directing a laser beam 402 contiguous the contact area between glass-based substrates 101, 201. In embodiments, laser beam 402 has a wavelength from about 2500 nm to about 3000 nm, or from about 2600 nm to about 2900 nm, or from about 2700 nm to about 2800 nm, such as 2500 nm, 2600 nm, 2700 nm, 2800 nm, 2900 nm, or 3000 nm, including all ranges and subranges therebetween. In embodiments, laser beam 402 includes a range of light wavelengths from about 2500 nm to about 3000 nm, or from about 2600 nm to about 2900 nm, or from about 2700 nm to about 2800 nm, such as 2500 nm, 2600 nm, 2700 nm, 2800 nm, 2900 nm, or 3000 nm, including all ranges and subranges therebetween. The wavelengths of laser beam 402 may be predetermined to coincide with an absorbing glass-based substrate. That is, the output wavelengths and power from laser beam 402 may be configured to be selectively absorbed by at least one or both of glass-based substrates 101, 201. In embodiments, the wavelengths of laser beam 402 is predetermined to coincide with the absorbance by hydroxyl (—OH) groups within the composition of one or both of glass-based substrates 101, 201. In embodiments, absorbance of wavelengths of laser beam 402 by glass-based substrates 101, 201 may be a function of the laser power and the thickness of the substrates (see FIG. 6).

Methods of the present disclosure may also include directing laser beam 402 to a location 301 within contact area 302 between glass-based substrates 101, 201. Laser beam 402 may be directed from a laser 400 through a lens (optional) or series of lenses (optional) onto one of glass-based substrates 101, 201. Directing laser beam 402 contiguous contact area 302 between glass-based substrates 101, 201 is also referred to a "laser irradiation" herein. Laser irradiation is provided in an amount sufficient to heat and bond glass-based substrates 101, 201 contiguous contact area 302. The amount or dose of laser irradiation is a function of the laser power output and the time of irradiation.

Figure 3:
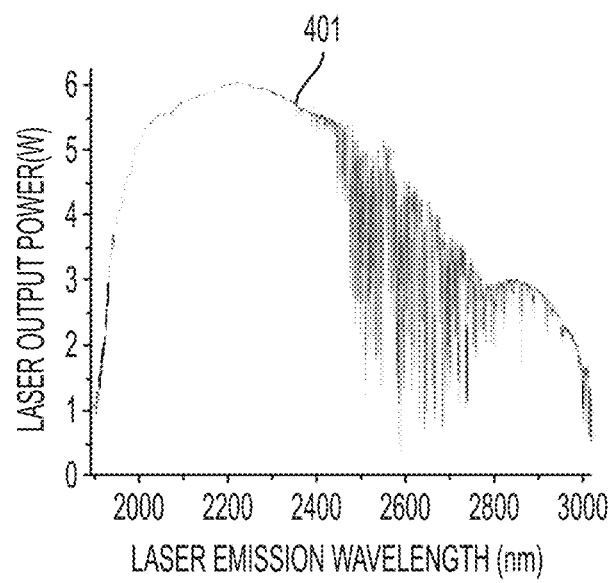
FIG. 3 is a plot of a laser tuning curve (laser output power (in Watts) as a function of the laser emission wavelength (nm)) for a laser in accordance with the present disclosure.
Figure 4:
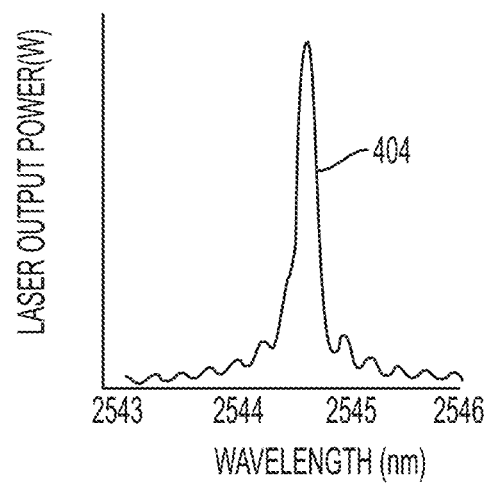
FIG. 4 is a plot of a laser output power (W) as a function of the laser emission wavelength (nm) as an example configuration within the laser turning curve of FIG. 3.

Laser 400 may output mid-infrared wavelengths. Laser 400 may output a wavelength range from about 1900 nm to about 3000 nm, or from about 2500 nm to about 3000 nm, or from about 2600 nm to about 2900 nm, or from about 2700 nm to about 2800 nm, such as 1900 nm, 2000 nm, 2100 nm, 2200 nm, 2300 nm, 2400 nm, 2500 nm, 2600 nm, 2700 nm, 2800 nm, 2900 nm, or 3000 nm, including all ranges and subranges therebetween. FIG. 3 provides an example laser 400 tuning curve 401 according to embodiments. FIG. 4 provides an example laser emission spectrum curve 404 for a specifically tuned laser 400 defined within tuning curve 401 in FIG. 3. The laser emission spectrum in FIG. 4 may have a full width at half maximum (FWHM) of about <0.5 nm according to embodiments. Laser 400 may have a power output from about 0.1 W to about 20 W, or from about 1 W to about 10 W, or from about 5 W to about 15 W, such as 1, 2, 3, 4, 5, 6, 7, 8, 9, 10, 11, 12, 13, 14, 15, 16, 17, 18, 19, or 20 W or more, including all ranges and subranges therebetween. Laser 400 may include a crystal including chromium (Cr):zinc sulfide (ZnS)/selenide (Se) or a crystal including chromium (Cr):zinc selenide (ZnSe)/sulfur (S). In embodiments, laser 400 may be a continuous wave laser. Laser 400 may be a CL, CLT, or similar series laser from IPG Photonics® or other laser manufacturing companies. In embodiments, laser 400 may be an optical parametric amplifier (e.g., from Coherent Inc.). Laser 400 of the present disclosure is not a short-pulse laser (e.g., with pulsed durations less than 100 picoseconds).

Figure 6:
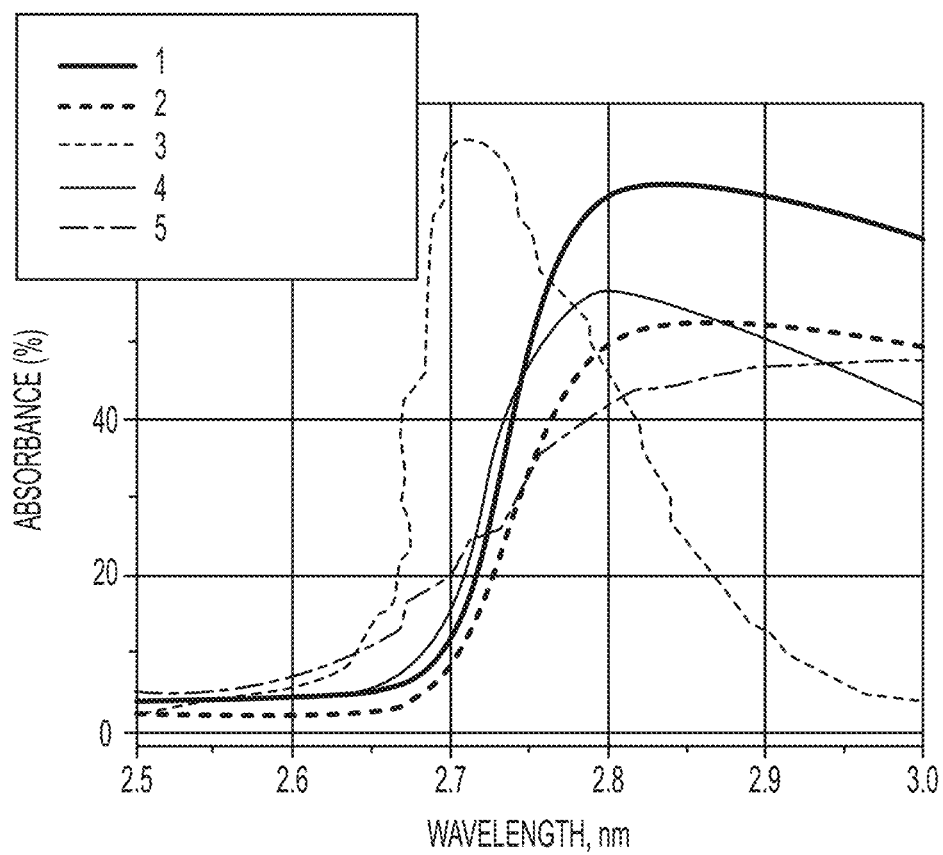
FIG. 6 is a plot of absorbance curves (%) for wavelengths from about 2500 nm to about 3000 nm for various absorbing glass substrates according to the present disclosure.

During laser irradiation, at least one of glass-based substrates 101, 201 absorbs light of laser beam 402 (also called an "absorbing glass-based substrate" herein). That is, one or both of glass-based substrates 101, 201 may be substantially opaque (and therefore absorbing) to wavelengths within laser beam 402. In embodiments, at least one of glass-based substrates 101, 201 absorbs light from laser beam 402 in an amount sufficient to heat and bond glass-based substrate 101 and glass-based substrate 201 contiguous contact area 302. In embodiments, at least one or both glass-based substrates 101, 201 are absorbing glass-based substrates. Absorbing glass-based substrates herein absorb at least a portion of wavelengths from laser beam 402. FIG. 6 provides a plot of 5 absorbance curves (from about 2500 nm to about 3000 nm) for various glasses for glass-based substrate 101 according to the present disclosure. Line 1 and 2 are absorbance curves for example alkali-aluminoborosilicate glasses in accordance with the present disclosure. Line 3 is an absorbance curve for an example fused silica glass in accordance with the present disclosure. Line 4 is an absorbance curve for an example aluminoborosilicate glass in accordance with the present disclosure. Line 5 is an absorbance curve for an example soda-lime glass in accordance with the present disclosure.

In embodiments, an absorbing glass-based substrate absorbs at least about 20%, or even about 30% or more, of wavelengths from about 2500 nm to about 3000 nm, or from about 2600 nm to about 2900 nm, or even from about 2700 nm to about 2800 nm, such as 2500 nm, 2600 nm, 2700 nm, 2800 nm, 2900 nm, or 3000 nm, including all ranges and subranges therebetween. In embodiments, an absorbing glass-based substrate absorbs at least about 50% or more of wavelengths from about 2600 nm to about 2900 nm, or even from about 2700 nm to about 2800 nm, such as 2600 nm, 2700 nm, 2800 nm, or 2900 nm, including all ranges and subranges therebetween. In embodiments, an absorbing glass-based substrate absorbs at least about 90% or more of wavelengths from about 2700 nm to about 2800 nm. When contacted with laser beam 402 contiguous contact area 302, absorbing glass-based substrates herein absorbs wavelengths from laser beam 402, is locally heated at a location 301 within contact area 302, swells to the adjacent substrate and forms a laser-induced bond 303. That is, absorbing glass-based substrates here are locally heated at a location 301 within contact area 302 when contacted with laser beam 402, and soften and interdiffuse into an adjacent substrate at said heated location 301.

Figure 1D:
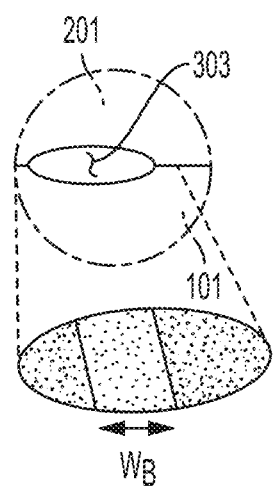

FIG. 1D illustrates laser-induced bond 303 within contact area 302 between glass-based substrates 101, 201. Laser-induced bond 303 joins or connects glass-based substrate 101 and glass-based substrate 102 following laser irradiation. Laser-induced bond 303 may be a direct bond between glass-based substrates 101, 201. Laser-induced bond 303 may have a width $W_B$ between glass-based substrates 101, 201 greater than about 50 micrometers, such as from about 50 micrometers to about 10 mm, or from about 100 micrometers to about 5 mm. In embodiments, width $W_B$ is formed by a single pass of laser 400. In embodiments, a height of laser-induced bond 303 cannot be distinguished from the thicknesses of glass-based substrates 101, 201 when viewed parallel to contact area 302. In embodiments, laser-induced bond 303 is localized to an area between glass-based substrates 101, 201. In embodiments, laser-induced bond 303 is localized to an area within contact area 302. In embodiments, laser-induced bond 303 is a fraction of an overlap area between glass-based substrates 101, 201. In embodiments, laser-induced bond 303 is a localized bond directly between glass-based substrates 101, 201. Laser-induced bond 303 may be formed by spot welding or continuous welding using laser beam 402 from laser 400. Laser-induced bond 303 may be transparent. In embodiments, laser-induced bond 303 transmits at least a portion of visible wavelengths. In embodiments, laser-induced bond 303 transmits at least a portion of wavelengths from about 400 nm to about 750 nm. In embodiments, laser-induced bond 303 transmits about 40% or more of wavelengths from about 400 nm to about 750 nm, or about 60% or more, or about 80% or more, such as 40%, 50%, 60%, 70%, 80%, 90% or more, including all ranges and subranges therebetween, of wavelengths from about 400 nm to about 750 nm. In embodiments, laser-induced bond 303 is colorless.

Absorbing glass-based substrates herein may include material that absorbs light from laser beam 402 in an amount sufficient to heat and bond to an adjacent glass-based substrate. Absorbing glass-based substrates may include a material (e.g., glass) with a hydroxyl (—OH) concentration within its composition of 100 ppm or more, 200 ppm or more, 400 ppm or more, 800 ppm or more, 1000 ppm or more, such as 100, 200, 300, 400, 500, 600, 700, 800, 900, 1000, 1100 ppm or more, including all ranges and subranges therebetween. Hydroxyl (—OH) concentration of substrates herein may be determined by IR spectroscopy. Absorbing glass-based substrates herein may include a soda-lime glass, an aluminosilicate glass, an alkali-aluminosilicate glass, a borosilicate glass, an alkali-borosilicate glass, an aluminoborosilicate glass, an alkali-aluminoborosilicate glass, or a fused silica glass. In embodiments, absorbing glass-based substrate may include "wet" fused silica (e.g., Corning HPFS® 7980, Asahi AQ Series, Asahi AQT Series, Asahi AQR Series). Absorbing glass-based substrates herein may include glass-based substrates from Corning Incorporated (e.g., Eagle XG®, Eagle 2000™, Willow®, etc.), Asahi Glass Co. (e.g., OA10, OA21, etc.), Nippon Electric Glass Co., NHTechno, Advanced Glass Industries, PEMCO, Samsung Corning Precision Glass Co., etc. Again, at least one or both of glass-based substrates 101, 201 is an absorbing glass-based substrate in accordance with the methods herein.

Optionally, one of glass-based substrates 101, 201 of article 100 may not absorb light of laser beam 402 (also called a "non-absorbing glass-based substrate" herein). That is, one of glass-based substrates 101, 201 may be substantially transparent (and therefore non-absorbing) to wavelengths within laser beam 402. In embodiments, a non-absorbing glass-based substrate absorbs about 10% or less, or even less than about 5%, of wavelengths from about 2500 nm to about 3000 nm, or from about 2600 nm to about 2900 nm, or from about 2700 to about 2800 nm, such as 2500 nm, 2600 nm, 2700 nm, 2800 nm, 2900 nm, or 3000 nm, including all ranges and subranges therebetween. That is, a non-absorbing glass-based substrate transmits >90%, or even ≥95%, of wavelengths from laser beam 402, for example. In embodiments, a non-absorbing glass-based substrate may include "dry" fused silica or high purity fused silica (e.g., Corning HPFS® 7979 IR Grade or 8655 ArF Grade, Asahi AQ2 Series, etc.). In embodiments, a non-absorbing glass-based substrate may include a material (e.g., glass) with a hydroxyl (—OH) concentration within its composition of less than about 10 ppm, or even or less than about 5 ppm, such as about 10, 9, 8, 7, 6, 5, 4, 3, 2, 1 ppm or less, including all ranges and subranges therebetween. Non-absorbing glass-based substrates may include high purity fused silica glass-based substrates from Corning Incorporated (e.g., 7979 IR Grade, 8655 ArF Grade, etc.), Asahi Glass Co. (e.g., AQ2 Series, etc.), Nippon Electric Glass Co., NHTechno, Advanced Glass Industries, PEMCO, Samsung Corning Precision Glass Co., etc. Non-absorbing glass-based substrates may also include high purity fused silica glass-based substrates with deuterated hydroxyl (—OH) groups (i.e., (-OD) groups). In embodiments where one of glass-based substrates 101, 201 is a non-absorbing glass-based substrate, the other glass-based substrate is an absorbing glass-based substrate in accordance with the methods herein.

In an embodiment, glass-based substrate 101 is an absorbing glass-based substrate and glass-based substrate 201 is a non-absorbing glass-based substrate. In such an embodiment, as shown in FIG. 1C, laser beam 402 is directed through glass-based substrate 201 onto glass-based substrate 101 within at location 301 within contact area 302. Laser beam 402 is transmitted by non-absorbing glass-based substrate 201 and contacts absorbing glass-based substrate 101 at location 301 within contact area 302. Accordingly, absorbing glass-based substrate 101 absorbs light from laser beam 402 in an amount sufficient to heat and bond to non-absorbing glass-based substrate 201. FIG. 1D illustrates laser-induced bond 303 between glass-based substrates 101, 201.

In an embodiment, glass-based substrate 201 is an absorbing glass-based substrate and glass-based substrate 101 is a non-absorbing glass-based substrate. In such an embodiment, laser beam 402 is directed through non-absorbing glass-based substrate 101 onto absorbing glass-based substrate 201 within at location 301 within contact area 302. Accordingly, absorbing glass-based substrate 201 absorbs light from laser beam 402 in an amount sufficient to heat and bond to non-absorbing glass-based substrate 101.

Figure 7:
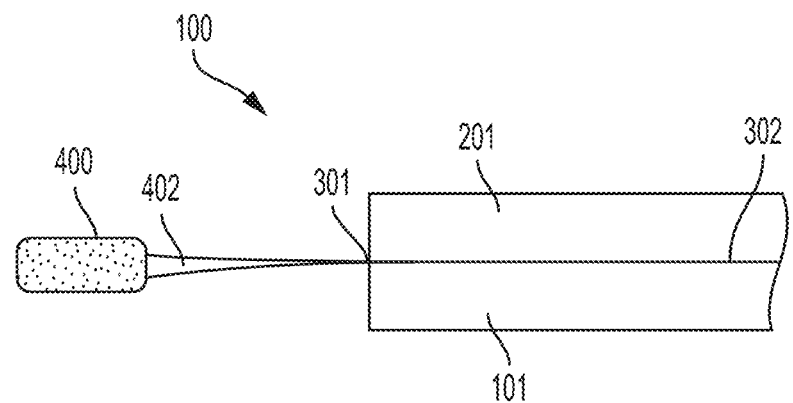
FIG. 7 illustrates a method step of laser-induced bonding of glass-based substrates according to an embodiment of the present disclosure.

In an embodiment, glass-based substrates 101, 201 are both absorbing glass-based substrates. In such an embodiment, laser beam 402 is directed contiguous contact area 302 between edges 103, 203 of glass-based substrates 101, 201. FIG. 7 provides an illustration of this method step. Accordingly, the edges of absorbing glass-based substrates 101, 201 absorb light from laser beam 402 in an amount sufficient to heat and bond to the adjacent glass-based substrate.

In embodiments, glass-based substrates 101, 201 may have OH peak spectrally shifted from each other, so that absorbance of substrate 201 is lower than of 101 (see FIG. 6). That is, glass-based substrates 101, 201 may have absorbance bands which are shifted from each other. Also, one of glass-based substrates 101, 201 may have a lower hydroxyl concentration than the other.

In embodiments, glass-based substrates 101, 201 are both a fused silica glass composition. In embodiments, at least one or both of glass-based substrates 101, 201 is a "wet" fused silica glass composition. In embodiments, one of glass-based substrates 101, 201 is a "wet" fused silica glass composition and the other glass-based substrate is a "dry" fused silica composition. Accordingly, the "wet" fused silica composition of glass-based substrate 101 and/or 201 absorbs light from laser beam 402 in an amount sufficient to heat and bond to the adjacent glass-based substrate. In embodiments, one of glass-based substrates 101, 201 includes a hydroxyl (—OH) concentration within its composition greater than about 100 ppm and the other glass-based substrate includes a hydroxyl (—OH) concentration within its composition of less than about 10 ppm.

Figure 2A:
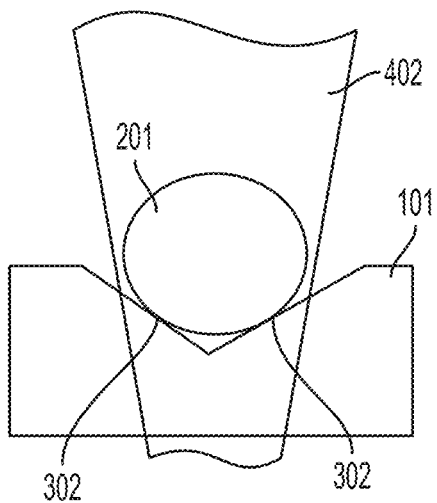
FIGS. 2A-B is method of laser-induced bonding of substrates according to another embodiment of the present disclosure.
Figure 2B:
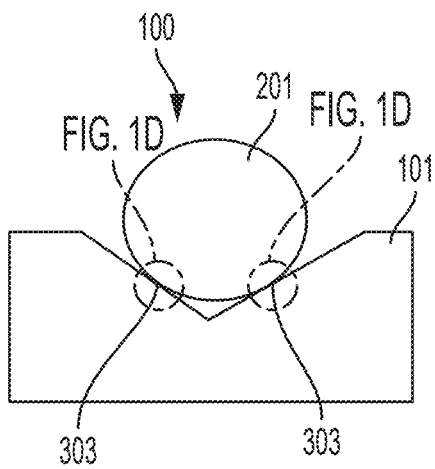

In embodiments shown in FIGS. 2A-B, one of glass-based substrates 101, 201 may be a glass rod or fiber and the other glass-based substrate may be a notched substrate. One of glass-based substrates 101, 201 is an absorbing glass-based substrate. In the method shown in FIG. 2A, glass-based substrate 201 is a non-absorbing glass-based substrate and glass-based substrate 101 is an absorbing glass-based substrate. Accordingly, absorbing glass-based substrate 101 absorbs light from laser beam 402 (which is transmitted through glass-based substrate 201) in an amount sufficient to heat the adjacent glass-based substrates along contact area 302. Of course, glass-based substrate 101 in FIG. 2A may be a non-absorbing glass-based substrate and glass-based substrate 201 an absorbing glass-based substrate such that laser beam 402 may be provided through glass-based substrate 101 onto glass-based substrate 201 for bonding. FIG. 2B provides an example transparent glass-based article 100 shape including at least one laser-induced bond 303 as illustrated in FIG. 1D.

Methods of the present disclosure may also include moving laser beam 402 along the contact area between glass-based substrates 101, 201. That is, methods of forming transparent article 100 may include moving or transitioning laser beam 402 from an initial location within contact area 302 to a final location within contact area 302. Laser beam 402 may be moved by altering the location of laser 400 relative to glass-based substrates 101, 201 or altering the location of substrates 101, 201 relative to laser 400. Laser beam 402 may also be moved by adjusting a lens or series of lenses between the laser 400 and substrates 101, 201. Laser beam 402 may be moved in any direction within contact area 302 to form any shaped bond between substrates 101, 201. In embodiments, laser beam 402 is a moved to form a linear bond, a circular bond, a squared bond (e.g., see FIG. 5), a triangular bond, or bonds of similar shape.

Figure 5:
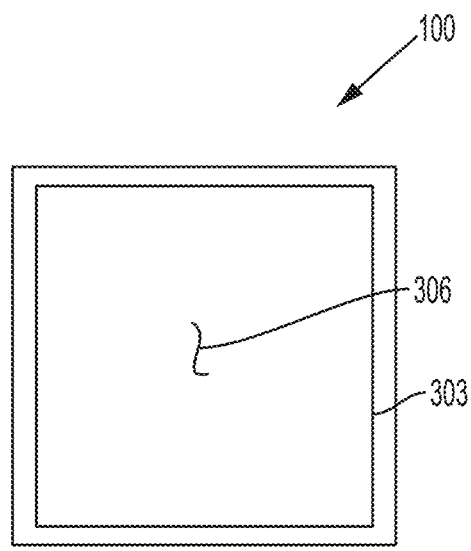
FIG. 5 is a top view of a sealed glass-based package formed according to methods of the present disclosure.

Methods of the present disclosure may also include moving laser beam contiguous or within contact area 302 to form a sealed area 306 between glass-based substrates 101, 201. That is, laser-induced bond 303 may form sealed area 306 between glass-based substrates 101, 201. Transparent glass-based article 100 including a sealed area 306 between glass-based substrates 101, 201 formed by laser-induced bond 303 may also be called a "glass-based package". FIG. 5 illustrates a glass-based article 100 or a glass-based package including a laser-induced bond 303 defining sealed area 306. Sealed area 306 may be any size within contact area 302. In embodiments, sealed area 306 is hermetically sealed. In embodiments, sealed area 306 includes a fluid (e.g., air, a noble gas, water, an organic, etc.) In embodiments, sealed area 306 is includes a pressure less than atmospheric pressure (e.g., $<10^{-2}$ torr). In embodiments, sealed area 306 is includes a pressure greater than atmospheric pressure (e.g., >5 atm). In embodiments, sealed area may contain an electronic component, a metal, an organic light emitting diode (OLED), a light emitting diode (LED), a display, a sensor, a protrusion, or similar objects.

Methods of the present disclosure may include etching a portion of one or both of glass-based substrates 101, 201. Etching may be done before arranging glass-based substrates 101, 201 relative to each other to form contact area 302, In embodiments, etching of one or both of glass-based substrates 101, 201 may be accomplished using a chemical etchant (e.g., hydrofluoric acid, hydrochloric acid, etc.) that dissolves or eliminates a portion of glass-based substrates 101, 201. Methods may also include masking one or both of glass-based substrates 101, 201 before etching along (predetermined) contact area 302 to protect glass-based substrates 101, 201 from etching at contact area 302. After etching, the etched away portion of one or both of glass-based substrates 101, 201 may be adjacent contact area 302 between glass-based substrates 101, 201. That is, the etched away portion of one or both of glass-based substrates 101, 201 may overlap contact area 302. In embodiments, as a result of etching, an etched volume may be created between glass-based substrates 101, 201 within contact area 302. In embodiments, the etched volume may be within sealed area 306. The etched volume may contain fluids, pressures, and objects similar to that disclosed for sealed area 306 above.

Methods of the present disclosure may also include terminating laser irradiation of glass-based substrates 101, 201 within contact area 302. Terminating laser irradiation may be accomplished by turning laser 400 off, blocking laser beam 402 from contacting glass-based substrates 101, 201, or shuttering laser beam 402. Methods of the present disclosure may also include annealing glass-based article 100 to alleviate or remove thermal stresses therein from laser irradiation.

Transparent glass-based article 100 includes at least two transparent glass-based substrates 101, 201 laser bonded together. Glass-based article 100 may be an OLED display, a glass stack, a glass sandwich, a lens construct, a laminate, an ophthalmic build, or other device. Glass-based article 100 may be used in stereolithography processes, cameras, ophthalmic equipment, electronic displays, electronic components, human wearable displays, windows, telescopes, vehicles, spacecraft, satellites, telecommunication equipment, or the like. Glass-based article 100 may be transparent and/or colorless.

In embodiments, glass-based article 100 includes glass-based substrate 101, glass-based substrate 201, and laser-induced bond 303. In embodiments, glass-based substrate 101 or glass-based substrate 201 absorbs or is capable of absorbing at a wavelength from about 2500 nm to about 3000 nm. In embodiments, laser-induced bond joins the glass-based substrate 101 and the glass-based substrate 201.

In embodiments, glass-based article 100 includes a first fused silica glass substrate 101, a second glass substrate 201, and a laser-induced bond 303. In embodiments, the first fused silica glass substrate absorbs or is capable of absorbing at a wavelength from about 2500 nm to about 3000 nm. In embodiments, the first fused silica glass substrate includes a hydroxyl (—OH) concentration within its composition greater than about 100 ppm. In embodiments, laser-induced bond connects the first fused silica glass substrate and the second glass substrate.

Methods of making glass-based article 100 may include arranging a first glass-based substrate 101 relative to a second glass-based substrate 201 to form a contact area 302. Methods of making glass-based article 100 may include directing a laser beam 402 including a light wavelength from about 2500 nm to about 3000 nm contiguous contact area 302 between glass-based substrates 101, 201. In embodiments, first glass-based substrate 101 absorbs light from laser beam 402 in an amount sufficient to heat and bond first glass-based substrate 101 and second glass-based substrate 201 contiguous contact area 302.

EXAMPLES

The present disclosure will be further clarified with reference to the following examples which are intended to be non-restrictive and illustrative only.

Example 1

Figure 8:
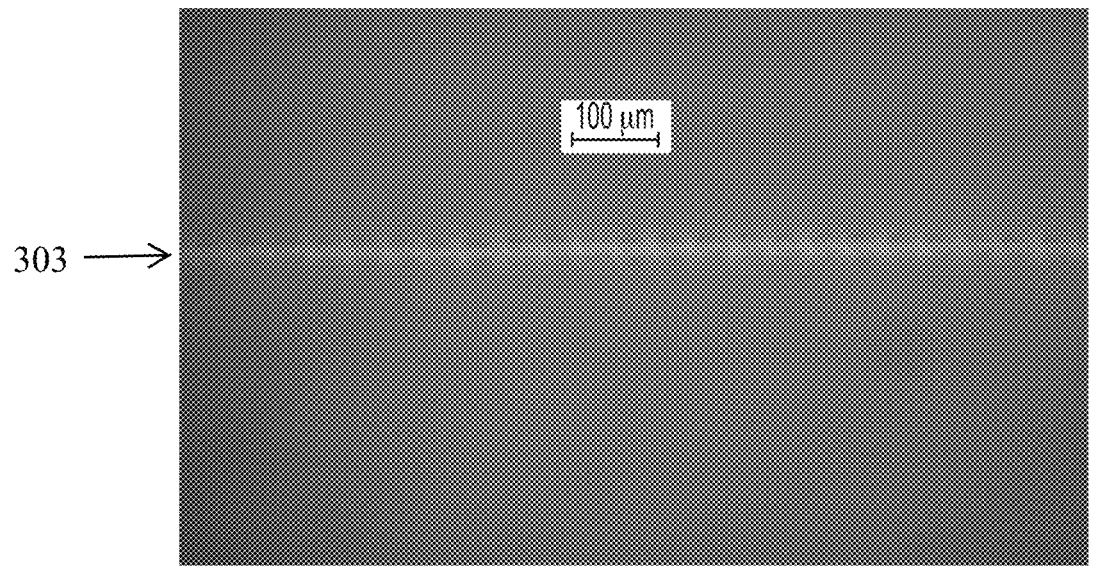
FIG. 8 is a top-view microscope photograph of a laser-induced bond formed as described in Example 1.
Figure 9:
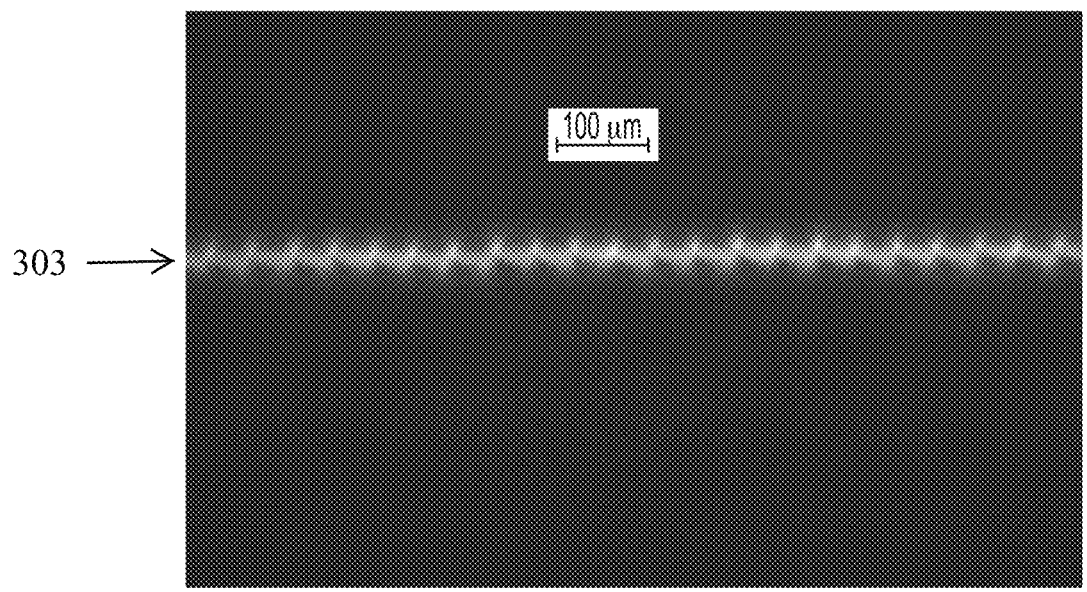
FIG. 9 is a top-view microscope photograph (viewed through crossed polarizers) of the laser-induced bond in FIG. 8.

In this example, a 30 Watt CL Series laser (available from IPG Photonics) having a chromium (Cr):zinc sulfide (ZnS)/selenide (Se) crystal was used to focus a 2750 nm continuous-wave laser beam 402 (with a laser emission spectrum curve 404 similar to that in FIG. 4) through flat glass substrate 201 (e.g., Corning HPFS® 7979 IR Grade, "dry" fused silica) onto flat glass substrate 101 (e.g., Corning HPFS® 7980, "wet" fused silica). The configuration was similar to that illustrated in FIG. 1C. Glass substrates 101, 201 were both transparent, colorless, and in direct contact along an area. Laser 400 was set at about 20 Watts. Laser beam 402 was focused on glass substrates 101, 201 at initial location 301 within contact area 302 and then moved (at about 1 mm/s) linearly through contact area 302 to a final location (about 20 mm from the initial location). Glass substrates 101, 201 were bonded together to form article 100 by a laser-induced bond 303. As provided in FIGS. 8 & 9, laser-induced bond 303 was transparent and colorless between glass substrates 101, 201.

Unexpectedly, the inventors have discovered that laser-induced bonding of fused silica is possible despite its very high softening point (e.g., ~2000° C.).

As used herein, the singular forms "a," "an," and "the" include plural referents unless the context clearly dictates otherwise. Thus, for example, reference to a "metal" includes examples having two or more such "metals" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component of the present disclosure being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

It will be apparent to those skilled in the art that various modifications and variations can be made to the present disclosure without departing from the spirit and scope of the disclosure herein. Since modifications combinations, sub-combinations and variations of the disclosed embodiments incorporating the spirit and substance of the present disclosure may occur to persons skilled in the art, the present disclosure should be construed to include everything within the scope of the appended claims and their equivalents.

What is claimed is:

1. An article comprising:
   a first glass-based substrate having a hydroxyl concentration of less than 5 ppm,
   a second glass-based substrate, having a hydroxyl concentration greater than 300 ppm, arranged in direct contact with the first glass-based substrate, the second glass-based substrate absorbs at least 20% of light, from a laser, at a wavelength from about 2500 nm to about 3000 nm in an amount sufficient to heat and bond to the first glass-based substrate to the second glass-based substrate, and
   a laser-induced bond joins the first glass-based substrate and the second glass-based substrate, wherein the laser-induced bond is a localized bond directly between the first glass-based substrate and the second glass-based substrate.

2. The article of claim 1, wherein the first glass-based substrate, the second glass-based substrate, or both comprises fused silica.

3. The article of claim 1, wherein the first glass-based substrate, the second glass-based substrate, or both comprises a soda lime glass, an aluminosilicate glass, an alkali-aluminosilicate glass, a borosilicate glass, an alkali-borosilicate glass, an aluminoborosilicate glass, or an alkali-aluminoborosilicate glass.

4. The article of claim 1, wherein the laser-induced bond is localized to an area between the first glass-based substrate and the second glass-based substrate including a width greater than about 50 micrometers.

5. The article of claim 1, wherein the laser-induced bond defines a sealed area between the first glass-based substrate and the second glass-based substrate.

6. The article of claim 1, wherein the first glass-based substrate or the second glass-based substrate is a pane, an optical fiber, a tube, a rod, a lens, a mirror, a blank, an ingot, a shield, or a filter.

7. An article comprising:
a first absorbing fused silica glass substrate comprising a hydroxyl concentration greater than about 300 ppm,
a second non-absorbing glass-based substrate, having a hydroxyl concentration of less than 5 ppm, arranged in direct contact with the first fused silica glass substrate, and
a laser-induced bond connects the first fused silica glass substrate to the second glass-based substrate, wherein the laser-induced bond is a localized bond directly between the first fused silica glass substrate and the second glass-based substrate,
wherein the first fused silica glass substrate absorbs at least 20% of light, from a laser, at a wavelength from about 2500 nm to about 3000 nm in an amount sufficient to heat and bond to the first glass-based substrate to the second glass-based substrate.

8. The article of claim 7, wherein the second glass-based substrate comprises a soda-lime glass, an aluminosilicate glass, an alkali-aluminosilicate glass, borosilicate glass, an alkali-borosilicate glass, an aluminoborosilicate glass, an alkali-aluminoborosilicate glass, or a fused silica glass.

9. The article of claim 7, wherein the first fused silica glass substrate absorbs at least 30% of light, from the laser, at a wavelength from about 2500 nm to about 3000 nm.

10. The article of claim 7, wherein the first fused silica glass substrate absorbs at least 90% of light, from the laser, at a wavelength from about 2700 nm to about 2800 nm.

11. The article of claim 7, wherein the first and second substrates transmit at least a portion of laser wavelengths from about 400 nm to about 700 nm.

12. The article of claim 7, wherein the first and second substrates transmit at least 60% of laser wavelengths from about 400 nm to about 700 nm.

13. The article of claim 7, wherein the first and second substrates are colorless.

14. The article of claim 7, wherein the laser-induced bond is a fraction of an overlap area between the first and second substrates.

15. The article of claim 7, wherein the bond comprising a width from about 1.5 micrometers to about 10 mm.

16. The article of claim 7, wherein the laser-induced bond forms a sealed area between the first substrate and the second substrate.

17. The article of claim 7, wherein the first fused silica glass substrate is a pane, a lens, a tube, a rod, a mirror, a blank, an ingot, a shield, or a filter.

18. The article of claim 7, wherein the second glass-based substrate absorbs less than about 5% of light, from the laser, at a wavelength from about 2500 nm to about 3000 nm.

19. An article comprising:
a first glass-based substrate having a hydroxyl concentration greater than 300 ppm,
a second glass-based substrate, having a hydroxyl concentration greater than 300 ppm, arranged in direct contact with the first glass-based substrate, the first and second glass-based substrates absorb at least 20% of light, from a laser, at a wavelength from about 2500 nm to about 3000 nm in an amount sufficient to heat and bond to the first glass-based substrate to the second glass-based substrate, and
a laser-induced bond joins the first glass-based substrate and the second glass-based substrate, wherein the laser-induced bond is a localized bond directly between the first glass-based substrate and the second glass-based substrate.

20. The article of claim 19, wherein the first glass-based substrate, the second glass-based substrate, or both comprises fused silica.

21. The article of claim 19, wherein the first glass-based substrate, the second glass-based substrate, or both comprises a soda lime glass, an aluminosilicate glass, an alkali-aluminosilicate glass, a borosilicate glass, an alkali-borosilicate glass, an aluminoborosilicate glass, or an alkali-aluminoborosilicate glass.

22. The article of claim 19, wherein the laser-induced bond is localized to an area between the first glass-based substrate and the second glass-based substrate including a width greater than about 50 micrometers.

23. The article of claim 19, wherein the laser-induced bond defines a sealed area between the first glass-based substrate and the second glass-based substrate.

24. The article of claim 19, wherein the first glass-based substrate or the second glass-based substrate is a pane, an optical fiber, a tube, a rod, a lens, a mirror, a blank, an ingot, a shield, or a filter.

* * * * *